United States Patent [19]

Ketcham et al.

[11] Patent Number: 5,350,637
[45] Date of Patent: Sep. 27, 1994

[54] MICROLAMINATED COMPOSITES AND METHOD

[75] Inventors: Thomas D. Ketcham, Big Flats; Leroy S. Share, Corning; Dell J. St. Julien, Watkins Glen, all of N.Y.

[73] Assignee: Corning Incorporated, Corning, N.Y.

[21] Appl. No.: 968,667

[22] Filed: Oct. 30, 1992

[51] Int. Cl.⁵ ............................................. B32B 18/00
[52] U.S. Cl. .................... 428/539.5; 428/545; 428/433; 264/60; 264/DIG. 36; 264/DIG. 57
[58] Field of Search ........ 264/58, DIG. 36, DIG. 57, 264/60; 428/545, 539.5, 432, 688, 428, 433, 689; 419/5, 8

[56] References Cited

U.S. PATENT DOCUMENTS

| | | | |
|---|---|---|---|
| 2,405,529 | 8/1946 | Smith | 175/41 |
| 3,195,030 | 7/1965 | Herzog et al. | 317/258 |
| 3,490,887 | 1/1970 | Herzog et al. | 65/33 |
| 4,340,436 | 7/1982 | Dubetsky et al. | 156/89 |
| 4,656,071 | 4/1987 | Virkar | 428/36 |
| 4,677,009 | 6/1987 | Virkar | 428/36 |
| 4,714,257 | 12/1987 | Heinrich et al. | 277/1 |
| 4,725,333 | 2/1988 | Leedecke et al. | 156/630 |
| 4,806,295 | 2/1989 | Trickett et al. | 264/59 |
| 4,835,656 | 5/1989 | Kitahara et al. | 361/321 |
| 4,849,292 | 7/1989 | Mizunoga et al. | 428/433 |
| 4,868,711 | 9/1989 | Hirama et al. | 361/321 |
| 5,059,582 | 10/1991 | Chung | 505/1 |
| 5,089,455 | 2/1992 | Ketcham et al. | 501/104 |
| 5,098,494 | 3/1992 | Reisman | 156/89 |

FOREIGN PATENT DOCUMENTS

| | | | |
|---|---|---|---|
| 0123186 | 10/1984 | European Pat. Off. | B32B 15/18 |
| 0441528A1 | 8/1991 | European Pat. Off. | B32B 18/00 |
| 63-278833 | 11/1988 | Japan | B32B 15/04 |

OTHER PUBLICATIONS

J. G. Pepin et al., "Electrode-Based Causes of Delaminations in Multilayer Ceramic Capacitors", J. Am. Ceram. Soc., 72 [12] 2287-91 (1989).

K. G. Shaw, "Fabrication of Plasma Sprayed Composite Structures", Proc. American Society for Composites, Sixth Technical Conference, pp. 145-153, Technomic Publishing Company, Lancaster, Penn. (1991).

H. C. Cao et al., "On Crack Extension in Ductile/Brittle Laminates", Acta. metall. mater. vol. 39, No. 12, 2997-3005, (Dec. 1991).

J. H. Givens et al., "Metal Matrix Composites: Titanium Nitride Films as Microlaminate Reinforcements", Metal & Ceramic Matrix Composites: Processing, Modeling & Mechanical Behavior, (R. B. Bhagat et al. Ed.), pp. 587-596, The Minerals, Metals & Materials Soc., 1990.

W. J. Clegg et al., "A simple way to make tough ceramics", Nature vol. 347, pp. 455-457 (4 Oct. 1990).

D. B. Marshall et al., "Enhanced Fracture Toughness in Layered Microcomposites of Ce-ZrO2 and Al2O3", J. Am. Ceram. Soc., 74 [12] 2979-87 (1991).

M. Yasrebi et al., "Biomimetic Processing of Ceramics and Ceramic-Metal Composites" Mat. Res. Soc. Symp. Proc. vol. 180, pp. 625-635 (1990).

A. Bose et al., "MIMLCs: Microinfiltrated macrolaminated composites . . .", Advanced Materials and Processes, Jul. 1991, pp. 19-22.

M. C. Shaw et al., "Bridging Processes in Metal-Reinforced Ceramics", Mat. Res. Soc. Symp. Proc. vol. 170, pp. 25-31, Materials Research Society (1990).

A. N. Virkar et al., "Strengthening of Oxide Ceramics by Transformation-Induced Stresses", J. Am. Ceram. Soc., 70 [3] 164-170 (1987).

R. A. Cutler et al., "Strength Improvement in Transformation-Toughened Alumina by Selective Phase Transformation", J. Am. Ceram. Soc. 70 [10] 714-718 (1987).

Primary Examiner—Donald P. Walsh
Assistant Examiner—Anthony R. Chi
Attorney, Agent, or Firm—Kees van der Sterre

[57] ABSTRACT

Microlaminated composite articles are made by combining one or more sheets of flexible sintered crystalline ceramic foil with one or multiple inorganic substrate layers, e.g., of metal foil, to form a stack which is then heated below the melting temperatures of the foil and substrate layers, and under slight or moderate pressure, to provide a well-bonded composite article which is essentially free of interlaminar cementing or sealing materials.

18 Claims, 3 Drawing Sheets

MICROLAMINATED COMPOSITES AND METHOD

BACKGROUND OF THE INVENTION

The present invention relates to composite articles formed of two or more inorganic materials of differing composition and properties, and more particularly to so-called "microlaminated" composites formed by the lamination of sheets of such inorganic materials.

Composites are often made to create a beneficial mix of the properties of dissimilar materials that can be unobtainable in a single homogeneous material. Two well-known examples of a type of composite structure using a layering of two materials to obtain such a mix of properties are "Samurai Swords" and "Damascus Steel". In these composites, hard but brittle carbide layers are interspersed with softer, ductile, tougher steel layers. In the Samurai case, these layers are created by repeated hammering and folding during the manufacture of the sword.

Newer varieties of metal matrix (ductile) composites reinforced with metallic and non-metallic fibers, whiskers, platelets and particles have also been developed. The reinforcing agents in these composites are intended to impart greater stiffness, higher yield strength or ultimate tensile strength, and/or higher creep resistance to the matrix material. Various methods have been employed to fabricate such composites. In the case of chopped fibers whiskers, platelets, or the like, mixtures of components may be melt processed or sintered to incorporate the reinforcing agents. Long fibers can be laid between metal sheets and the metal sheets deformed around the fibers to obtain a densified composite, although for large fibers a great deal of plastic deformation is necessary to make the matrix material flow around the fiber to make a dense matrix.

Intermetallic compounds are also topics of composites research and, although classed as semi-brittle materials, offer some advantages over conventional alloys. However, while they can be reinforced with ceramic materials, difficulties due to limited ductility and thermodynamic incompatibility with ceramic reinforcing materials are more common, particularly where substantial plastic deformation of the intermetallic is required during manufacture.

Brittle materials such as glass and ceramics are even harder to process, crystalline ceramics being particularly difficult to manufacture to net shape at precise tolerances. Thus ceramics and glass have been largely limited to low stress applications or to areas where their properties (optical transparency, high dielectric constant, etc.) are essential.

Toughened fiber-reinforced ceramic matrix composites for high-stress applications have recently been developed, but the high pressure/high temperature consolidation processing needed for the manufacture of these composites greatly adds to their cost, and the achievement of a truly uniform distribution of reinforcing fibers therein remains difficult.

In broad aspect, composites can be classified into brittle/brittle, brittle/semibrittle, and brittle/ductile categories, depending upon the particular combinations of brittle materials (eg., ceramics) and ductile materials (eg., metals) used in their construction. Layered or laminated composites, familiar in products such as capacitors and multilayer electronic substrates, comprise a well-recognized subgroup of composite structures.

The physical processes involved in the manufacture of well-bonded laminated composites include co-sintering, hot pressing, metal infiltration, and diffusion bonding. Co-sintering is employed in the fabrication of ceramic/ceramic and metal/ceramic composites, with metal infiltration and diffusion bonding also being employed for the latter. For very thin layers of ceramic or metal, vapor deposition processes including ion plating and/or plasma spraying have been employed.

Laminar composites incorporating glass layers can be bonded by hot pressing or glass sintering at temperatures where the glass can wet adjoining materials. In fact, some composites include powdered glass simply as a sealing material to bond otherwise incompatible metallic or ceramic laminae into a unitary structure. U.S. Pat. Nos. 4,868,711 (Hirama et al.) and 3,490,887 (Herczog et al.) offer examples of glass-containing composites.

In the prior art, ceramic/metal laminates have quite often used relatively thick ceramic laminae. For example, Cao and Evans, in "On Crack Extension in Ductile/Brittle Laminates", Acta metall. mater., Vol. 39, No. 12 pp. 2997–3005 (December 1991), have described alumina/aluminum composites comprising 1 mm commercial IC substrate alumina sheets as ceramic layers.

Thinner ceramic layers have been produced in ceramic capacitors, electronic substrates, and similar composites by co-sintering. For example, Marshall et al. in "Enhanced Fracture Toughness in Layered Microcomposites of Ce-ZrO2 and Al2O3", J. Am. Ceram. Soc., 74 [12] 2979–87 (1991), describe laminar composites of Ce-ZrO2 and Ce-ZrO2+Al2O3 with layers on the order of 10–100 micrometers in thickness using colloids with sequential centrifugation and co-sintering.

Unfortunately, ceramic/ceramic and ceramic/metal co-sintering processes present serious obstacles to the attainment of truly homogenous and defect-free composite structures. Such obstacles include relatively crude and non-uniform layer structures, curling or wrinkling of the structures during the co-sintering process, and pin-hole or other layering defects. In the case of metal/ceramic composites, for example, the metal powder and the ceramic powder must sinter in nearly the same temperature range, and the densification shrinkages of the ceramic and metal cannot be too different. Also, kinetically and thermodynamically stable combinations of materials should be used, with compatible partial pressures of gaseous species (PO2 and PH2O) being maintained during sintering.

The manufacture of metal/ceramic composites for capacitors provides a practical example of co-sintering as presently practiced. In that process, ceramic powders and metallic powders are combined, eg., by tape casting the ceramic layer and screen printing the metal layer, and the resulting laminae are stacked and heated to remove binders and solvents. Thereafter, the debindered stacked structures are heated to sinter the metal and ceramic materials. However, before sintering is attempted the stacks are first diced into relatively small chip sizes as required for capacitor use.

While satisfactory for capacitor fabrication, the manufacture of mechanically durable composites from continuous sheets of unsintered powder materials is not practical. This is primarily due to the very high shrinkage factors involved. Even with relatively well matched ceramic and metallic starting materials, extensive layer shrinkage during powder sintering favors the formation of multiple layer defects, eg., pin-hole defects as in metal capacitor films. In addition, large scale layer fluctuations and laminate distortions can occur, as previously noted. These kinds of defects are not significant in products such as capacitors, which are generally below 1 cm size and which can tolerate a relatively high number of process-induced pin-hole defects in the metal layers. Where the mechanical properties of the composites are key, however, such defects are not acceptable.

It is therefore a principal object of the present invention to provide an improved process for the fabrication of microlaminated composites which provides well-bonded laminar articles with improved layer structure.

It is a further object of the invention to provide microlaminated composites offering improved physical integrity and structural uniformity.

Other objects and advantages of the invention will become apparent from the following description thereof.

SUMMARY OF THE INVENTION

The present invention provides microlaminated composites in a wide variety of brittle/ductile, brittle/semibrittle and brittle/brittle combinations. The brittle layers in these composites are introduced into the composite structure as highly uniform, pre-sintered ceramic sheets or tapes. The ceramic sheets or tapes are provided as flexible, high-strength polycrystalline ceramic foils, these foils having thicknesses generally not exceeding about 250 micrometers. The foils may be of near-theoretical density (non-porous), or they may be porous (up to about 60% porosity), but in all cases they will have been sintered prior to use to approximately the level of density selected for the composite structure to be provided.

The composites of the invention are well-bonded laminar structures wherein the ceramic foils are bonded directly to ductile, semibrittle or brittle substrate materials. Hence the foil-substrate interfaces are essentially free of added adhesive interlayer materials. The composites may be fabricated by low-pressure, high temperature consolidation methods, and exhibit excellent ceramic/substrate bonding even at the low consolidation pressures customarily employed.

The bonding achieved is attributed to the uniform nature and unique high temperature bonding characteristics of the flexible polycrystalline ceramic foils forming the brittle layer materials in these composites. This bonding behavior, attributed in part to plastic or superplastic deformation of the ceramic at elevated temperatures, provides firm adhesion to metallic, intermetallic and other ceramic laminae in the composite even where extremely low-pressure lamination processing is used.

In one aspect, then, the invention resides in an improved method for making microlaminated composite articles incorporating ceramic layers. In accordance with that method, at least one sheet of flexible sintered crystalline ceramic foil and at least one inorganic substrate layer of a metal, intermetallic compound or crystalline ceramic material are provided. The ceramic foil sheet is stacked on the substrate layer, and the resulting stack is heated under pressure at a temperature and for a time at least sufficient to obtain permanent bonding of the ceramic foil sheet to the inorganic substrate layer.

While in concept the substrate layer could comprise the surface of a bulk metal, intermetallic, or ceramic object, it is more typically a thin sheet of substrate material. Hence, the composite is generally made by providing a plurality of sheets of flexible sintered crystalline ceramic foil and a plurality of the inorganic substrate layers, the latter also being in the form of preconsolidated sheets (sheets essentially free of organic binder constituents).

The two types of sheets are formed into a sheet stack wherein at least some of the sheets of ceramic foil are in contact with adjacent inorganic substrate sheets. In the preferred stack configuration, the ceramic foil sheets are interleaved with the substrate sheets, most preferably in an alternating layer configuration, although other stacking or weaving configurations may alternatively be used.

The resulting sheet stack is then heated as a unit, with the application of light pressure, to the temperature required to obtain the desired permanent bonding of the ceramic foil sheets to the substrate sheets. The pressures required during heating can be as small as 1 kPa and will seldom exceed 500 kPa, although much higher pressures can be used if for some reason they are deemed desirable.

The temperatures needed to obtain permanent bonding of these ceramic foils to inorganic substrates are generally below the lowest melting temperature of the ceramic foils and inorganic substrate materials used in the composite. By the lowest melting temperature is meant the lower of the respective melting temperatures of the ceramic foil and substrate layer material used. This permits bonding to be carried out without any gross deformation of either of the layered materials.

The minimum temperature for good bonding is presently considered to be a temperature approximately 300° C. below the lowest sintering temperature of the ceramic foil and inorganic substrate layer(s). Again, by the lowest sintering temperature is meant the temperature corresponding to the lower of the respective minimum sintering temperatures of the ceramic foil and substrate layer material used.

As previously noted, the preferred practice in accordance with the invention is to provide multiple inorganic substrate sheets, these sheets most preferably consisting of sheets of metallic or intermetallic foil. These foil sheets are partly or wholly interleaved with the ceramic foil sheets to provide a sheet stack of alternating layer structure, or of more complex layered structure, if desired. Of course, more than one type of ceramic foil and one type of substrate layer material can also be used.

In another aspect the invention includes microlaminated composite articles of improved structural homogenity and integrity. These articles generally comprise a plurality of layers (two or more) of ceramic foil, these foil layers being partly or wholly interleaved by a plurality of metallic or intermetallic substrate layers. The layers of ceramic foil are directly bonded to the substrate layers in contact therewith, direct bonding meaning ceramic/metallic bonding between the ceramic foil and metal, without the aid of any intermediary cementing or sealing material.

Characteristic of these composites, the layers of ceramic foil and the metallic substrate layers will have thicknesses not exceeding about 250 micrometers (more preferably not exceeding 100 micrometers), while the metal foil layers will have thicknesses up to about 1 mm. In addition, the ceramic and metal layers will have at least one dimension of length or breadth in excess of 1 cm, yet will be essentially free of pin-hole defects. This excellent layer quality is due to the fact that only presintered sheets and foils are used in the fabrication of the composites. Thus the shrinkage encountered in co-sintering processes, which invariably tends to introduce defects into the ceramic or metallic layers of co-sintered structures, is entirely avoided.

In addition to their excellent structural homogeneity and integrity, the microlaminated composites of the invention offer physical properties which are closely controllable over a very broad range of permissible values. Hence, the properties of the ultimate products depend simply upon the compositions, thicknesses, and properties of the ceramic foils and metallic or intermetallic materials selected for incorporation therein.

Numerous applications for microlaminated composites provided in accordance with the invention have been identified. Depending upon whether brittle, semibrittle, or ductile interleaving materials are used to construct the composites, structural microlaminates for cutting tool applications, for high temperature components for heat engines, for refractory support structures in catalytic conversion applications, and for a wide variety of other products requiring physical properties not available in components formed of only a single ceramic or metallic material, have now been found to be practicable.

DESCRIPTION OF THE DRAWING

The invention may be further understood by reference to the drawings wherein.

DETAILED DESCRIPTION

A particular advantage of microlaminate manufacture in accordance with the invention is that the usual sequence of fabrication, i.e., ceramic densification after formation of the laminate with green (unsintered) ceramic material, is reversed. Thus sintering of the ceramic laminae precedes microlaminate fabrication, permitting full non-destructive inspection of the ceramic, metallic, or other laminae by optical, X-ray, or other methods prior to composite fabrication, This construction sequence not only insures much higher product reliability, but also greater latitude in the design of the layer structure of the composite. Hence, as dense ceramic sheets of different sizes and compositions are easy to make, sort and store, complicated structures can be made by laying up ceramic sheets of varying sizes and compositions. The sheets need not run across the entire structure.

Based on this approach to microlaminate construction, microlaminates incorporating substantially defect-free layers, yet having layer sizes in one or more dimensions easily exceeding one centimeter, or even 5 or 10 centimeters, can easily be made. And the construction is not limited to extremely thin metal films, or to metals with expansion properties closely matching the properties of the ceramic components of the composites.

A wide variety of polycrystalline ceramic materials may be used to provide thin flexible ceramic foils for the construction of microlaminated composites as herein described. Methods for making flexible ceramic foils are disclosed in U.S. Pat. No. 5,089,455, that patent disclosing that many different ceramics are amenable to sintered sheet forming in accordance with that patent.

Examples of ceramics useful for foil fabrication include zirconia, stabilized or partially stabilized zirconia, hafnia, alumina, $\beta$-alumina, $\beta''$-alumina, silica, titania, mullite, spinel, chromium oxide, sialon, hasicon, silicon or titanium carbides and/or nitrides, zircon, zirconium carbide, and titanium diboride. A variety of stabilizers may be present in the zirconia-based ceramics, including any of the well-known alkaline earth oxide and rare earth oxide stabilizers alone or in combination.

In addition to the other single-phase ceramic systems of the above types, two- or multi-phase ceramics containing the above materials in any of a wide variety of combinations may also be used to provide sintered flexible sheet. Ceramic foils consisting essentially or at least predominantly (greater than 50% by weight) of the above ceramic materials or mixtures thereof are particularly preferred.

The foil may also be produced through the crystallization of a glass in powder or thin sheet form, ie., it may be a glass-ceramic sheet. Examples of glass-ceramics amenable to sheet-forming and use as ceramic foils in accordance with the invention particularly include alkaline earth aluminosilicate glass-ceramics, such as cordierite and anorthite glass-ceramics.

Flexible ceramic foils such as above described are uniquely suited for microlaminate fabrication because of their strength and toughness, as well as because of their flexibility. To best facilitate handling of the foils, and to gain full advantage from the use of pre-sintered ceramic foils in the composite structure, we prefer to use ceramic foils having a toughness ($K_{IC}$) of over 1.5 MPa $\sqrt{m}$, more preferably over 2.0 MPa $\sqrt{m}$.

The thickness of the flexible ceramic foils to be used for microlaminate fabrication in accordance with the invention significantly affects the lamination performance of the material. Sheet thicknesses in excess of 500 micrometers are to be avoided, while sheets on the order of 250 micrometers or less in thickness should offer adequate lamination performance. Foils thinner than about 1 micrometer offer no advantage and require that a large number of sheets be handled. Thus we generally prefer to employ foils with thicknesses in the 10–100 micrometer size range, with 25–50 micrometer foils being particularly preferred for best composite bonding.

In general, thicker sintered sheet can be substituted for thinner sheet where higher pressure consolidation of the sheet stack can be tolerated. On the other hand, the preferred thinner sheet is easier to bend elastically, develops higher stress for a given applied pressure, plastically deforms more rapidly by high temperature creep, and thus bonds faster. Also, thinner ceramics develop more interfaces, which can lead to higher toughness. Advantageously, flexible sintered sheet of the kinds provided in accordance with the aforementioned patent exhibit excellent flatness, such that very little plastic flow and deformation of the sheet is required to form a good bond against adjacent material layers such as metal foils.

A wide variety of substrate or interlayer materials can be combined with the described flexible sintered ceramics to produce well bonded composites. Such materials may include metals (single-component as well as metal alloys), intermetallics, and other ceramics. Examples of metals useful for such microlaminates are ferrous metals including stainless steels, copper, aluminum, nickel, nickel-based alloys, titanium, molybdenum, niobium, tungsten, tantalum, chromium, and high-temperature metal alloys such as the chromium-based alloys. Representative examples of intermetallic compounds which may be used include titanium aluminide and nickel aluminide.

Ceramic interlayer materials, including any of the ceramics useful for the flexible sintered ceramic foils themselves (but differing in composition therefrom to achieve a composite material with composite properties), can also provide integral and well-bonded composites. Other potential ceramic interlayer materials could include thin sheets or tapes of single crystal materials, such as sapphire or silicon. The ranges of thickness and preferred thickness applicable to the selection of ceramic foils as above described are also applicable to the selection of substrate sheets, for composites incorporating a plurality of substrate layers.

Due to the thinness of the laminae present in the composites of the invention, we have found that integral composite structures can be fabricated even where there is a substantial difference in thermal expansion coefficients between the layered materials. The use of such diverse materials as metals and ceramics may be facilitated through the use of flexible ceramics of lower elastic modulus, higher porosity, and smaller grain size, leading to a lower deformation temperature for the ceramic sheet. In the case of high expansion metal interlayers, a lower elastic modulus, greater porosity, and/or higher ductility in the metal all promote better structural integrity in the product.

In general, the highest degrees of interface bonding and structural integrity have been observed in microlaminates of brittle/ductile (ceramic/metallic) type. Good bonding is also achievable in intermetallic and all-ceramic microlaminates, but is presently considered to require closer attention to interfacial geometry, microstructure and chemistry in order to achieve optimum results.

As previously indicated, the levels of pressure required to achieve well bonded composites in these microlaminate systems is extremely low. Pressures as low as 1 kPa have been used successfully in some of the preferred metal/ceramic systems, with pressures above 50 kPa seldom being required in these systems except where sheets exhibiting relatively poor flatness and/or relatively high thickness are employed.

As previously noted, the lamination temperatures required for good bonding in these composites are relatively low, with temperatures will below the minimum sintering temperatures of the ceramic foil and metal substrate layers being useful for this purpose. Preferably, however, lamination will be carried out at a lamination temperature $T_L$ within a preferred range of lamination temperatures as follows:

$$(T_{LS}-200)<T_L<T_{LM}$$

wherein TLS and TLM are the lowest sintering and lowest melting temperatures, respectively, of the ceramic foil and metal substrate layers included in the composite structure.

Advantageously, due to the extremely low consolidation pressures which can be used, expensive hot pressing equipment is not required, and consolidation tooling for these microlaminates can be made of inexpensive and easily machinable materials of only moderate strength. In fact, simple porous refractory oxides can be used for molding surfaces, these providing both adequate strength and sufficient high temperature stability for even the most refractory of the available flexible ceramic sheet materials.

A further advantage stemming from the high flexibility of the component materials used in these microlaminates is that the near-net-shape fabrication of composite products becomes much more practical. Thus, even for complicated shapes, the component sheets can be laid up at room temperature in substantially the final configuration of the desired product, and consolidation of the microlaminate thereafter achieved at moderate pressure and without the large shrinkage and/or shape changes normally accompanying the consolidation of fiber-reinforced composites by high pressure processing. Additionally, since the densification steps precede and are separate from the subsequent shape-forming and bonding steps in our method, the precise construction of microlaminates with graded or other complex composition profiles becomes achievable.

In actual practice, of course, there is a practical limit to the strain which can be applied at room temperature without breakage of ceramic foils such as described, and this limit can be exceeded where complex three-dimensional curves are to be developed in the microlaminated composite products to be fabricated. A simple example of such a case would be a domed or saddle-shaped microlaminated structure with curvature about two or more axes. For shapes of this complexity, large amounts of plastic deformation (>10%) are required, not for the lamination, but to form the shape.

Whereas metals, polymers, and the like can easily be corrugated or otherwise shaped, the shaping of essentially flat sintered ceramics has up to now not been practical. Instead, the complex forming of ceramic bodies had been achieved by direct casting or by the shaping of green ceramic material disposed on a polymer or paper support, the shaped green material then being stacked and fired.

Unexpectedly we have now discovered that, at appropriate temperatures, these ceramic foils can be rapidly reformed with little or no change in physical properties, after sintering but prior to laminating, to provide corrugated or three-dimensionally curved thin foil shapes. Thus these ceramic foils can, if desired, be preformed into complex curves prior to stacking, and foils of matching curvature can then be stacked and quickly consolidated to provide microlaminated composites of complex three-dimensional shape as efficiently as for flat or cylindrical composites. This near-net--shape preforming approach both reduces the plastic deformation necessary during lamination and enhances the ease of bonding.

The process of providing curved preformed ceramic foils as described comprises heating a flexible ceramic foil to a temperature which is in the range from about 300° C. (more preferably 200° C.) below the minimum sintering temperature of the ceramic to just below the melting temperature thereof, and then applying pressure to the foil sufficient to shape it into a selected curvature at a rapid strain rate. By a rapid strain rate is meant a strain rate above about $5 \times 10^{-3}$/second, preferably above $10^{-2}$/second. Only very slight pressures are required for this purpose.

This strain rate is a rate well in excess of conventional reforming strain rates for polycrystalline ceramic sheet or plate, and is a commercially viable rate. In fact, we have achieved strain rates in the range of $1.5-5 \times 10^{-2}$/second for both foil crimping and for foil elongation, with ceramic foil of approximately 20 micrometer thickness as above described.

Strain rates of this magnitude readily permit the production, for example, of corrugated ceramic foil at a corrugation radius of curvature of about 0.328 mm (3.05% permanent strain) in a foil reforming interval of about 0.75 seconds. Such strain rates are considered to be attainable in the above-disclosed temperature range, for any of the aforementioned ceramic foils, at foil thicknesses up to about 250 micrometers.

For complex bodies, then, a preferred method of fabrication is to produce individual preformed ceramic and metal foil sheets of the appropriate shape through plastic or superplastic deformation as described, stack them at room temperature, and then laminate them. The result is a substantial reduction in the amount of material transport necessary during formation of complex parts, ie., reduced lamination time.

This preferred approach also provides a "decoupling" of the steps of composite fabrication, in that the shaping of the various metallic and ceramic foil materials for a selected composite structure can be carried out at temperatures and pressures optimum for the individual layers. Thus the layers do not all have to be taken through the entire fabrication process together, but may be individually shaped, coated, or otherwise pretreated.

Techniques analogous to those used for hot glass sheet forming may be used for ceramic foil preforming in accordance with the above process. These include the use of preheated die or mold sets of refractory ceramic (eg., a set of corrugated alumina molds), refractory forming rolls or gears, or vacuum or pressure forming against a porous or non-porous forming mold. Due to the slight thicknesses of these ceramic foils, extremely rapid heating rates conducive to rapid reforming can be used without risking thermal shock damage.

The efficiency of ceramic sheet reforming as above described is demonstrated by the case of stabilized zirconia sheet (zirconia plus 2 mole percent of yttria stabilizer), provided in the form of flat, thin, flexible ceramic foil ribbons of 13–28 micrometers thickness. A matched set of refractory (alumina) corrugated reforming dies was preheated in a furnace to approximately 1370° C., the furnace then opened, and the flat foils placed between the molds. The furnace was then closed and brought back to temperature, at which time the dies were closed with an applied reforming pressure of 740 Pa (0.1 psi) for a few seconds. The products removed from between the die set were corrugated zirconia ribbons (corrugation period of 4.8 mm and amplitude of 1.2 mm), all of which retained excellent flexibility in directions not constrained by the corrugation.

For most successful fabrication of microlaminates by low-pressure consolidation as described, a number of useful guidelines have been developed. These include (i) carrying out sheet stack consolidation at a high enough temperature that all of the materials employed can plastically deform; (ii) selecting constituent materials such that the thermal expansion coefficients are not too different; (iii) positioning the more brittle laminae (usually the ceramic foils) so that they are in compression after lamination at ambient temperature; (iv) selecting constituent materials which are kinetically and thermodynamically stable with respect to one another (and with respect to the bonding environment) at bonding temperatures; (v) selecting the flattest available ceramic foil materials; and (vi) avoiding unnecessary thickness variations in the ceramic and substrate layers (except where thickness variations are part of the composite design).

From the standpoint of consolidation processing, a consolidation approach wherein one or more of the molds used to apply consolidation pressure to the sheet stacks is free to change orientation and/or shape to apply the most uniform possible pressure to the stack is useful. The employment of mold release agents which are compatible with the mold and sheet stack materials at the selected molding temperatures will be found beneficial in some cases. Finally, it is particularly desirable to avoid the introduction of foreign matter into the sheet stack, since such can introduce defects even where the sheets have previously been consolidated to defect-free condition.

The invention may be further understood by reference to the following detailed examples thereof, which however are intended to be illustrative rather than limiting.

EXAMPLES 1–13

To provide a series of brittle/ductile (ceramic/metal) microlaminated composites, thin dense flexible ceramic foils are first provided by a flexible sheet manufacturing process. The process used is as described in U. S. Pat. No. 5,089,455 (Examples 1–3), utilizing commercially available zirconia and alumina powders. The zirconia powders used were commercial yttria-stabilized zirconia powders TZ-2Y and TZ-3Y, purchased from the Tosoh Chemical Company of Tokyo, Japan, while the alumina powder used was powder RC-HP-DBM alumina (MgO free) obtained from Malakoff Industries, Malakoff, Tex., U.S.A.

Two powder batches were used in the preparation of the foils. The first consisted of TZ-3Y yttria-stabilized zirconia (containing 3 mole percent $Y_2O_3$). The second consisted of a mixture of alumina (20 weight percent) and TZ-2Y yttria-stabilized zirconia (80 weight percent), the latter containing 2 mole percent of yttria as a stabilizer.

Three different peak firing temperatures (1300° C., 1350° C., and 1430° C.) are used to prepare a total of four different ceramic foil types from these powders, the firing temperature variations being used in order to provide a range of different grain sizes in the ceramic materials. The samples are in each case maintained at the peak firing temperature for two hours in an air atmosphere. All of the resulting sheet samples are essentially pin-hole-free square sheets 20 mm on a side and having a sheet thickness in the range of 30 to 45 micrometers (<2 mils).

Sheets of second layer materials for the microlaminates to be provided are also provided, these consisting of sections of essentially pin-hole-free metal foil having thicknesses of 51 or 38 micrometers (2 or 1.5 mils). The foils are composed either of 410 stainless steel or of nickel (99.5% weight purity). Table 1 below sets forth a summary of the ceramic foils and metal foils used for microlaminate fabrication, including compositions, thicknesses and, where appropriate, sintering temperatures for each of the sheets and foils selected.

TABLE 1

| Sheet I.D. | Sheet Composition | Thickness (μm) | Sintering Temp.(°C.) |
|---|---|---|---|
| A | zirconia (3 m % Y$_2$O$_3$) | 30-45 | 1430° |
| B | zirconia (3 m % Y$_2$O$_3$) | 30-45 | 1350° |
| C | zirconia (3 m % Y$_2$O$_3$) | 30-45 | 1300° |
| D | 20% wt. alumina + 80% wt. zirconia (2 m % Y$_2$O$_3$) | 30-45 | 1300° |
| X | nickel (99.5%) | 51 | — |
| Y | 410 stainless steel | 38 | — |
| Z | 410 stainless steel | 51 | — |

To form sheet stacks for microlaminates from the materials shown in Table 1, the metal foils are cut into 20 mm (0.75 in) squares and layered in alternating fashion with the squares of presintered ceramic foil. The sheet stacks are then sandwiched between alumina pressing surfaces (consisting of flat alumulna platens or, for curved products, curved alumina molds made from alumina crucible sections), and a light force (on the order of 7.6 kPa) is then applied to the selected pressing surfaces by means of a weighted alumina crucible.

The sheet stacks so assembled and compressed are next heated under the applied pressing forces to a peak bonding temperature in the range of 1300°-1400° C., this peak temperature being maintained for about 2 hours. Heating is carried out in a tungsten mesh vacuum furnace at a pressure of about $10^{-5}$ tort, with heating and cooling rates in the range of 650°-700° C. per hour being used.

A summary of the microlaminated composites made by the above procedure is set forth in Table 2 below. Included in Table 2 for each of the Examples reported are a sample number, sheet identifications for the ceramic foil and metal foil used (from Table 1), and the number of layers, bonding temperatures and bonding pressures used for each sample.

TABLE 2

Microlaminated Composites

| Example No. | Ceramic Sheet | Metal Foil | No. of Layers | Applied Press.(kPa) | Bonding Temp.(°C.) |
|---|---|---|---|---|---|
| 1 | A | Z | 3 | 2.1 | 1300° |
| 2 | A | Z | 9 | 2.1 | 1300° |
| 3 | A | Z | 7 | 2.8 | 1350° |
| 4 | A | Z | 7 | 2.8 | 1400° |
| 5 | A | Y | 7 | 5.5 | 1350° |
| 6 | A | Y | 27 | 7.6 | 1400° |
| 7 | B | Y | 31 | 7.5 | 1400° |
| 8 | C | Y | 25 | 7.6 | 1400° |
| 9 | C | Z | 21 | 8.3 | 1400° |
| 10 | A | X | 13 | 8.3 | 1300° |
| 11 | A | X | 13 | 8.3 | 1350° |
| 12 | C | Z | 7 | 8.3 | 1400° |
| 13 | D | Z | 25 | 8.3 | 1400° |

Some procedural variations in the preparation of the samples in Table 2 may be noted. Examples 1-8 in the Table were consolidated without any side constraints, whereas the sheet stacks of Examples 9-11 were prevented from shifting during firing by a square jig of sintered alumina. In the manufacture of curved Example 12, the curved crucible sections used to compress the sheet stack were not of identical curvature, but instead displayed a center gap when in contact with each other. The pieces used to press curved Example 13 were of closely matched curvature.

Evaluation of the microlaminates provided in accordance with these examples included a determination of the strength of the interlayer bonding achieved. One severe test employed to test for good bonding was edge cutting and edge grinding, a procedure which tended to initiate edge delamination in composites with somewhat lower interlayer bond strength. Electrical resistivity measurements were also performed.

An inspection of the Examples listed in Table 1 indicated at least some strong interlayer bonding in every case, with the extent and/or strength of the bonding generally increasing in the stainless steel samples at the higher bonding temperatures and pressures. Thus while Example 1 was well bonded in spots, Examples 6-9 demonstrated very good bonding across most or all of the samples, except in areas where insufficient pressure had been applied. Examples 8 and 9 utilized zirconia sheet sintered at 1300° C. for smaller crystal grain size; this could have enhanced the high temperature plasticity and thus the deformation bonding of the laminae. The nickel-containing samples (Examples 10 and 11) also showed good interlaminar bonding, with slightly better integrity being shown by Example 10 which was bonded at the lower of the two hot-pressing temperatures used.

Curved samples 12 and 13 each had a radius of curvature somewhat less that 3.5 cm. Example 12 was well bonded at both edges but not at the center, due to the center gap in the molding pieces. However, Example 13 was excellently bonded throughout, a result we attribute in part to the use of a zirconia-alumina ceramic laminae which had been pre-sintered by firing at 1300° C. The combined effect of the alumina second phase and the low sintering temperature yielded a fine grain size (below 0.5 micrometers) in this sheet, which facilitated high temperature plastic deformation of the ceramic during consolidation of the sheet stacks.

Several of the microlaminated composites reported in Table 2 were tested for room temperature resistance both parallel and perpendicular to the plane of the microlaminates. Table 3 below reports the results of these measurements for selected samples.

TABLE 3

| | Electrical Resistivity | |
|---|---|---|
| Example No. | Perpendicular Resistance (ohms) | Parallel Resistance (ohms) |
| 6 | $1.0 \times 10^6$ | 0.05 |
| 7 | $2.5 \times 10^6$ | 0.05 |
| 8 | $4.0 \times 10^6$ | 0.08 |
| 13 | $20 \times 10^6$ | 0.1 |

The results shown in Table 3 are representative of the highly anisotropic nature of these ceramic/metal microlaminates in terms of both composition and physical properties. Based on these results, other chemical and physical properties of these composites are also expected to be highly anisotropic.

In utilizing flexible ceramic foils of fine grain size to provide microlaminated products such as described, it is found that long heating times are not required to produce excellent interlayer bonding of the composites. Lamination trials using flexible stabilized zirconia (2%m Y$_2$O$_3$) sheets of 40-45 micrometers thickness, interlaminated with 410 stainless steel foil of 51 micrometers thickness and hot pressed at 16.5 kPa (2.4 psi) and 1400°, provided well-bonded microlaminates in firing times of 30 minutes, 10 minutes, and even one minute.

While it was found useful at these temperatures and pressures to use molybdenum foil separation sheets to prevent adherence of the composites to the alumina molding platens, the bonding results clearly demonstrate that very rapid forming operations, e.g., rolling, could be successfully applied to the microlamination process.

Figure 1:
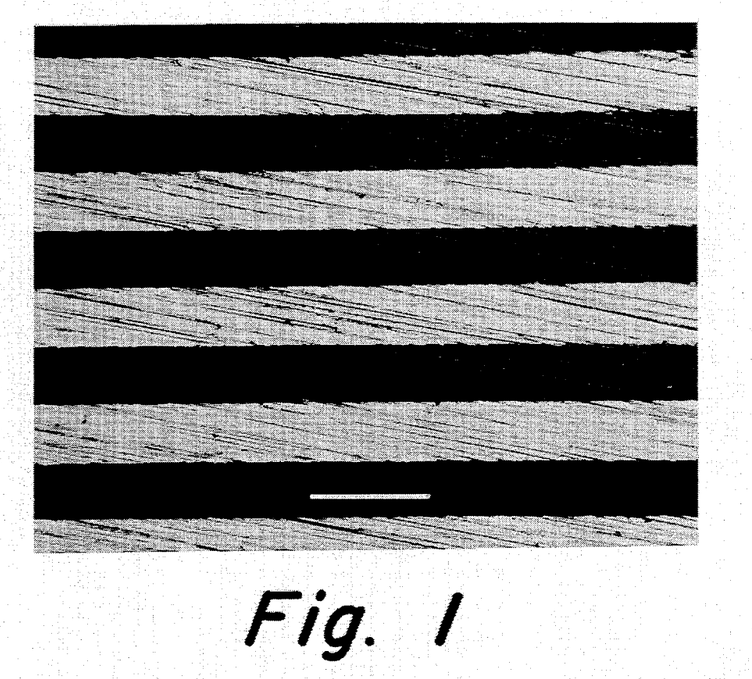
FIG. 1 is an optical photomicrograph of a cross-section of a brittle/ductile microlaminated composite of the invention.

FIG. 1 of the drawing is an electron photomicrograph of a cross-section of a stainless steel/zirconia (TZ-2Y) microlaminate such as reported in Table 1, wherein the white bar represents a dimension of about 100 μm. That figure shows a view of a cut and ground edge of the composite, the composite having been made using 50 μm steel foil and 50 μm ceramic foil by lamination for 2 hours at 1300° C. and a pressure of 17.2 kPa. The high degree of uniformity of the layers and the absence of layer defects and interlayer edge delamination are plainly evident from this photomicrograph.

While the bonding process operative to produce durable microlaminates in accordance with the invention is not fully understood, it is presently theorized that high temperature deformation of the flexible sintered ceramic layers is the principal bonding mechanism. This deformation may occur through grain boundary diffusion controlled creep (Coble creep) or by lattice diffusion controlled creep (Nabafro-Herring creep). Such creep is virtually certain to be present during plastic deformation of these materials at high temperature, along with grain sliding and grain switching events when the plastic deformation reaches high strains.

As previously indicated, the method of the invention is not limited to the production of microlaminates wherein all layers are of the same size, or of alternating compositions, or of only two different compositions. Instead, the ability to use pre-sintered ceramic and metal foil permits the design and production of much more elaborate layered constructions offering unique properties, as illustrated by the following examples.

EXAMPLE 14

Three strips of flexible sintered ceramic foil composed of stabilized zirconia (2 mole % yttria), each strip being 6.4 mm (¼ in.) wide, 36.5 mm (1¼ in.) long, and 40–45 micrometers thick were provided for incorporation in a sheet stack. To form the base layer in the stack, these strips were alternated side-by-side with two strips of 410 stainless steel foil of approximately the same dimensions as the ceramic strips.

The next layer of the stack was similarly formed, but with three strips of metal foil alternated with two strips of ceramic, and with the side-by-side strips of ceramic and metal foil rotated 90° from the alignment of the strips in the preceding layer. Square leaves of the steel foil were then placed on the top and bottom of the two alternating strip layers.

Figure 4:
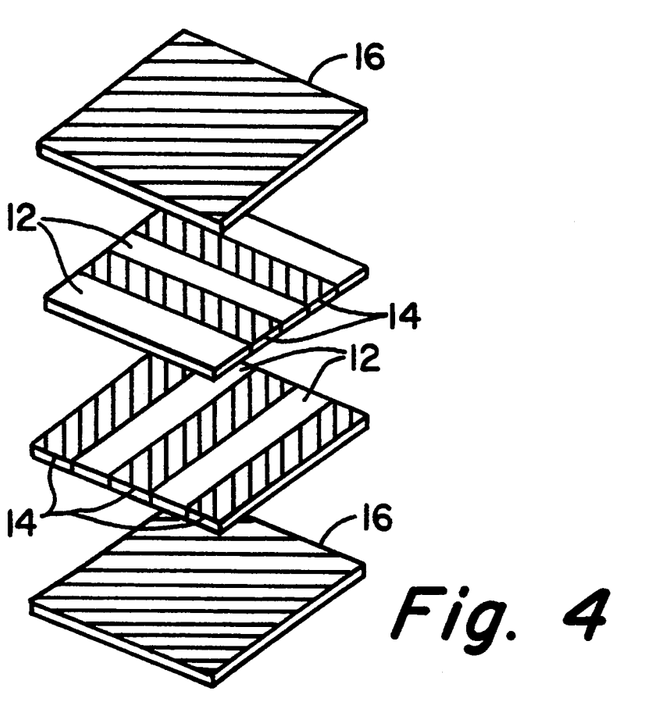
FIG. 4 schematically illustrates a first alternative construction for a composite sheet stack useful in accordance with the invention.

FIG. 4 of the drawing provides a schematic illustration in the form of an exploded view of this layer construction, showing the side-by-side orientation of the ceramic foil strips 12 and steel foil strips 14 forming the alternating strip layers. The layers thus formed are then positioned between the outer steel foil leaves 16.

To form a sheet stack for a final composite plate, the above layer construction was repeated two more times, and the resulting sheet stack was then consolidated at 1400° C. at a pressure of 4.1 kPa (0.6 psi) for two hours. Inspection of the composite thus provided indicated that good interlayer bonding among all of the layers of the composite had been achieved.

A particular advantage of the composite structure described is that the ceramic laminae effectively form a creep resistant skeleton, or matrix, within which the metal can provide ductility in all fracture directions as well as a continuous electrically conducting network. Additionally, the use of ceramic strips, rather than sheets as in the previous examples, can provide products of essentially unlimited size, while the use of wedge-shaped or other irregular strip configurations could provide products of even more complex curvature and/or shape.

Figure 5:
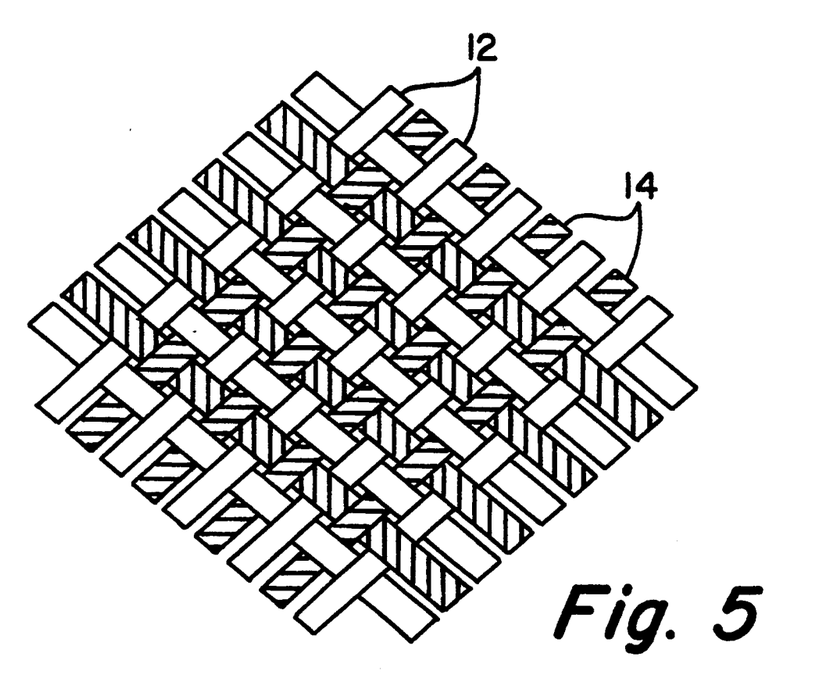
FIG. 5 schematically illustrates a second alternative construction for a composite sheet stack useful in accordance with the invention.

Other complex sheet stack configurations, including woven configurations, have also been demonstrated. A schematic illustration of a typical woven structure utilizing a simple weaving design is provided in FIG. 5 of the drawing. In that construction, alternating strips of ceramic foil (light strips, strips 12 being representative) and metal foil (hatched strips, strips 14 being representative) have been interwoven with a similar number of crossing strips, also of ceramic and metal foil. An example of the processing of a microlaminated composite constituting a simple variant of the above design is provided by the following example.

EXAMPLE 15

Four strips of sintered zirconia (2 mole % yttria) sheet, approximately 40 micrometers thick by 38.1M (1½ in.) long by 4.8 mm (3/16 in.) wide were woven in a simple basket weave with six strips of 410 stainless steel foil. The steel foil was approximately 51 micrometers thick, 38.1 mm (1½ in.) long, and 4.8 mm (3/16 in.) wide. This woven structure was placed on a base layer comprising a 38.1 mm square zirconia sheet sandwiched between facing layers of steel foil of the same square dimensions. This multilayer structure was duplicated once, and then a top layer consisting of the zirconia-sandwiched steel foil was finally added. The sheet stack with woven laminae thus provided was then hot pressed at 4.1 kPa (0.6 psi) and 1400° C. in a vacuum for two hours. Inspection of the resulting microlaminated composite indicated excellent interlaminar bonding, although with slight cracking of the composite at points of ceramic/ceramic overlap. It was considered that a process change wherein the application of pressure to the sheet stack would be delayed until after heating to the peak bonding temperature would easily avoid these defects.

The advantages of this weaving approach are several. First, it can overcome delamination difficulties in microlaminate composite systems wherein interlayer bonding is limited by slight interlayer bonding incompatibilities. Secondly, woven layers permit the fabrication of larger and more complicated shapes structures because woven sheets can more readily be reshaped into curved configurations.

The use of porous pre-sintered ceramic foil as well as non-porous or highly densified sintered sheet can also yield useful microlaminated composites, as shown by the following example.

EXAMPLE 16

Six sheets of partially stabilized zirconia (zirconia-3 mole % yttria) having a 22.2 mm (⅞ in,) square shape and a thickness of about 60 micrometers are interlaminated between seven sheets of 410 stainless steel foil. In this case, however, the zirconia sheet is pre-sintered sheet having a porosity of about 50 volume percent, the sheet having been produced by the firing of green zirconia sheet to a peak temperature of only about 1100° C. for 2 hours. This sintering treatment removes all organic and other contaminants from the zirconia but does not fully consolidate the zirconia powder to zero open porosity.

The sheet stack thus provided is hot-pressed at 1200° C. and at a pressure of 12.1 kPa (1.75 psi) under vacuum for 2 hours. Inspection of the resulting microlaminate indicated that a well-bonded composite article had been achieved. The overall porosity of the final microlaminate (zirconia plus steel) was measured at about 25%, indicating that consolidation without a reduction in the porosity of the ceramic foil had successfully been achieved.

Another advantage of the method of the invention resides in the ease with which the relative proportions of brittle and non-brittle materials may be adjusted, or changed in specified target areas with these composites, without significant impact on the process of composite consolidation. The following examples illustrate these features.

EXAMPLE 17

A microlaminated composite comprising a relatively low volume fraction of polycrystalline ceramic is fabricated from a predominantly steel sheet stack, the stack being made by alternating 410 stainless steel layers 51 micrometers (2 mils) thick with layers of zirconia - 2 mole % yttria sintered sheet less than 15 micrometers thick. To obtain a high ductile phase content, the sheet stack was constructed by stacking three steel layers on a single ceramic foil layer, repeating this layer group two additional times and covering with a single ceramic foil layer. This core stack was then sandwiched between steel covering laminae, each being two steel foil layers in thickness.

This stack was then hot-pressed at 1400° C. for two hours in a vacuum furnace under an applied pressure of less than 13.8 kPa (2 psi). The resulting composite, containing only approximately 15.5 volume % of zirconia ceramic, was well bonded and durable.

EXAMPLE 18

A microlaminated composite comprising a relatively low volume fraction of ductile metal is fabricated from a predominantly ceramic sheet stack, the stack being made by placing one 410 stainless steel foil layer (51 micrometers thick) between two three-sheet groups of flexible sintered zirconia ceramic (zirconia - 2 mole % yttria) foil. The zirconia foils forming the outer groups were approximately 30-35 micrometers in thickness, yielding a group thickness of about 100 micrometers.

The resulting sheet stack was consolidated by hot pressing at 1400° C. for 2 hours at a pressure slightly less than 13.8 kPa (2 psi) in a vacuum furnace. The consolidated product was a well-bonded and durable microlaminate with a metal content on the order of 20 percent by volume.

EXAMPLE 19

An asymmetric microlaminated body was made by alternating three zirconia - 2 mole % yttria ceramic layers about 30-35 micrometers in thickness with one layer of stainless steel foil about 51 micrometers (0.02 in) in thickness, repeating this layering pattern once. The resulting sheet stack was consolidated by hot-pressing at 1400° C. for 2 hours at a pressure below 13.8 kPa (2 psi) in a vacuum furnace. The product was a well-bonded durable composite.

As previously noted, the method of the invention is not limited in its operability to the use of any particular composition of brittle layer (ceramic) material. Instead, any of a relatively broad range of ceramic and glass-ceramic materials may usefully be selected for incorporation in these microlaminated systems. Further, the interlayered or second layer materials need not be limited in their composition only to metals such as steel or nickel, but could instead comprise any of a variety of other metal, metalloid, intermetallic or ceramic materials. The latter may comprise glass-ceramic, polycrystalline ceramic, or even glass interlayers, if desired.

Table 4 below sets forth examples of microlaminated composites fabricated of some of these alternative materials in accordance with the invention. Included in Table 4 for each of the composites provided are an identification of the brittle and second layer materials used, the numbers and thicknesses of the layers, and the consolidation conditions of heat and pressure used for composite consolidation. All composites were square composites in the 19-25 mm size range.

TABLE 4

| Example No. | Brittle Layer (No.-Thick.) | Interlayer (No.-Thick.) | Consolid. Pressure | Consolid. Temp. (°C.) |
|---|---|---|---|---|
| 20 | alumina + 15% ZrO$_2$ 8–40 μm | borosilicate glass 7–90 μm | 19.3 kPa (2.8 psi) | 685° |
| 21 | zirconia(TZ-2Y) 7–15 μm | borosilicate glass 6–90 μm | 22.9 kPa (3.33 psi) | 685° |
| 22 | cordierite g/c. 4–40 μm | silicon (1-xtal.) 5 @ 290 μm | 24.1 kPa (3.5 psi) | 850° |
| 23 | cordierite g/c. 6 @ 40 μm | copper 7 @ 127 μm | 24.1 kPa (3.5 psi) | 850° |
| 25 | CAS g/c. 7 @ 44 μm | nickel 8 @ 51 μm | 16.5 kPa (2.4 psi) | 1300° |
| 26 | ZrO$_2$( + Al$_2$O$_3$ + CAS), 7 @ 50 μm | molybdenum 8 @ 25 μm | 16.5 kPa (2.4 psi) | 1450° |
| 27 | CAS + Al$_2$O$_3$ 7 @ 50 μm | 410 stainless 8 @ 51 μm | 16.5 kPa (2.4 psi) | 1300° |
| 28 | CAS + ZrO$_2$ 7 @ 50 μm | nickel 8 @ 51 μm | 16.5 kPa (2.4 psi) | 1300° |
| 29 | zirconia(TZ-2Y) 11 @ 50 μm | copper 12 @ 25 μm | 16.5 kPa (2.4 psi) | 1000° |
| 30 | alumina/MgO 8 @ 36 μm | aluminum 7 @ 100 μm | 17.2 kPa (2.5 psi) | 550° |
| 31 | alumina/MgO 7 @ 50 μm | tungsten 8 @ 100 μm | 25.4 kPa (3.7 psi) | 1600° |
| 32 | alumina + 15% ZrO$_2$ 5 @ 30 μm | niobium 6 @ 250 μm | 25.4 kPa (3.7 psi) | 1600° |
| 33 | alumina/MgO 7 @ 50 μm | tantalum 8 @ 12.5 μm | 25.4 kPa (3.7 psi) | 1600° |
| 34 | ZrO2 + 20% Al2O3 24 @ 10-15 μm | zirconia (TZ-2Y) 23 @ 10-15 μm | 11.7 kPa (1.7 psi) | 1500° |

Inspection of the microlaminated composites reported in Table 4 indicated that well-bonded composites were achievable in all of the systems shown. In the glass interlayer composites (Examples 20 to 21), however, which utilized Corning Code 0211 alkali zinc borosilicate glass interlayers, plastic deformation of the flexible ceramic layers was not achieved at the consolidation temperatures used, so the bonding realized was not high-temperature deformation bonding but instead conventional glass-to-ceramic sealing.

In Examples 22 and 23, the flexible ceramic (brittle) layers were cordierite glass-ceramic (g/c.) sheets produced by the crystallization of powdered magnesium aluminosilicate glasses. These were found to produce well-bonded composites with both single-crystal silicon (Example 22) and copper metal (Example 23), thus showing promise for integrated circuit and electronic substrate applications.

Examples 25–28 utilized sintered ceramic foils based on calcium aluminosilicate (CAS) glass-ceramics (g/c.) wherein anorthite constituted the principal crystalline phase. In the nickel-containing microlaminate (Example 25) bonding was excellent even though there was some evidence of reduction of the ceramic at the ceramic/metal interfaces.

In Example 26, the CAS glass-ceramic (17 wt. %) was present as an additive along with alumina (17 wt. %) in a yttria-stabilized zirconia base, this combination ceramic showing excellent bonding to the molybdenum foil. Examples 27 and 28 utilized ceramic foil containing 60% and 50% CAS glass-ceramic, respectively, with the remainder of the foil composition comprising the oxides shown. These samples also showed excellent interlaminar adherence to the stainless steel and nickel substrate layers.

Example 29 showed excellent bonding between yttria-stabilized zirconia and copper, while Example 30 combining alumina (with 1% of MgO sintering aide) and aluminum metal also showed good bonding. However, in the latter case, the alumina ceramic could not plastically deform at the bonding temperature used. Thus flatness in the ceramic foil is particularly important in microlaminates such as these, in order to minimize unbonded areas and the need for extensive plastic reshaping of the deforming (less refractory) layer.

Figure 2:
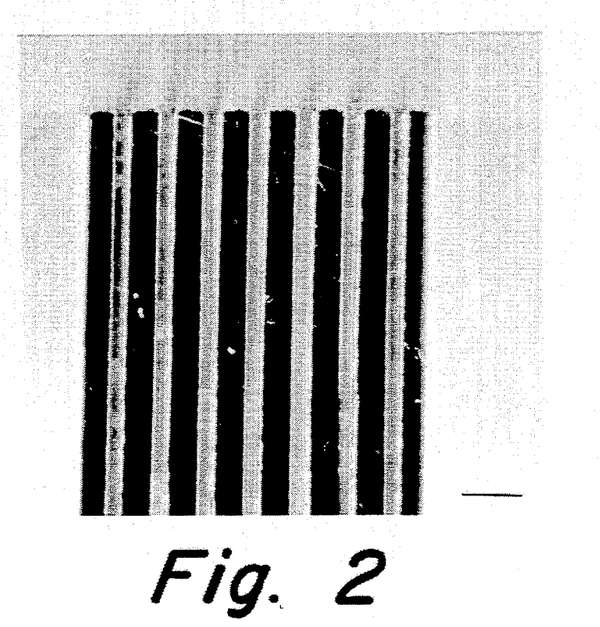
FIG. 2 is an optical photomicrograph of an edge-ground cross-section of a brittle/semibrittle microlaminated composite of the invention.

Example 31 showed that excellent bonding is obtainable in a tungsten/alumina (semi-brittle/brittle) composite structure. The composite of that example was sufficiently durable to be edge-ground to a 90° cutting edge, such as would be utilized for an edge on a cutting tool. FIG. 2 of the drawing is an electron photomicrograph of an edge-ground composite of this composition, the bar representing a dimension of 200 μm, wherein the 90° edge can be observed along the top boundary of the layered structure. The complete absence of delamination of the tungsten sheets (dark layers) from the alumina foil (light interlayers) is readily apparent.

Example 32, comprising a laminate of alumina/zirconia (alumina with 15% TZ-2Y) with niobium also exhibited generally good bonding. Example 33 comprising tantalum foil, which demonstrated good bonding in an initial evaluation, did exhibit some edge delamination when subjected to abrasive grinding and polishing.

A typical example of a ceramic-ceramic (brittle/brittle) microlaminate is provided by Example 34 of the Table. That laminate, a bar approximately 5.7 cm in length formed of interlayered zirconia foil (TZ-2Y) and zirconia/alumina foil (20% Al2O3; 80% TZ-3Y zirconia), exhibited excellent bonding after lamination at 1500° C. for 2 hours in air.

Figure 3:
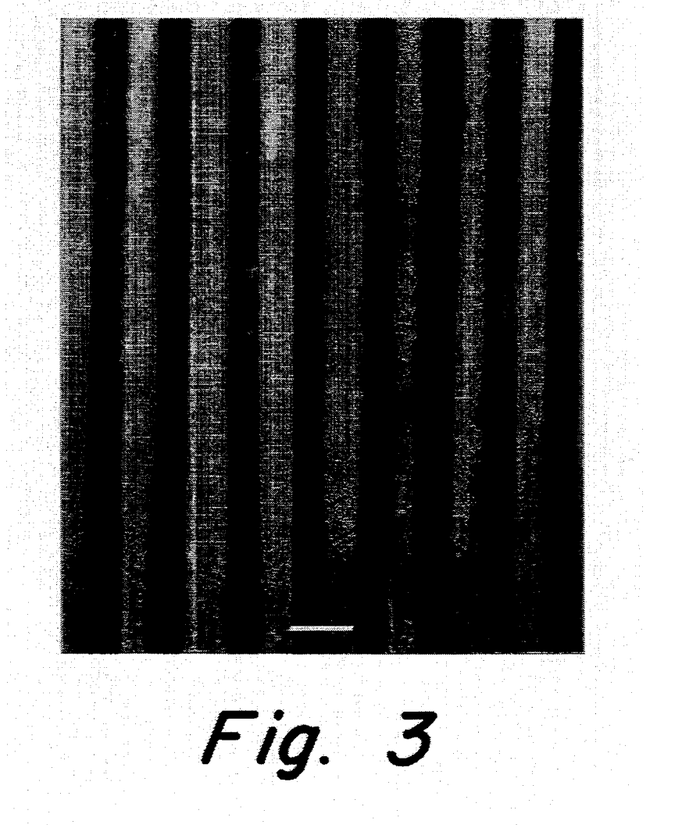
FIG. 3 is an optical photomicrograph of a cross-section of a brittle/brittle microlaminated composite provided in accordance with the invention.

FIG. 3 of the drawing is an electron photomicrograph of a cross-section of a microlaminate formed in accordance with Example 34, taken under dark field illumination and wherein the bar represents a dimension of 20 μm. The layer structure of this composite is well-formed, with no microcracks observed perpendicular to or through the layers of the composite despite the brittle nature of the laminae and the relatively high thermal expansion mismatch therebetween. The few voids or separation cracks observed at the layer interfaces were attributed to cracking during edge grinding and/or a slightly less than optimum bonding temperature, Another particular advantage associated with metal/ceramic microlaminated composites provided in accordance with the invention relates to the versatile joining characteristics thereof, particularly in the difficult area of joining ceramics to metals. The following example is illustrative.

EXAMPLE 35

A twenty-five layer microlaminate comprising twelve sheets of zirconia (2 mole % yttria) alternatingly interleaved with thirteen sheets 410 series stainless steel foil was fabricated by consolidating the sheet stack at a temperature of 1400° C. and a pressure of 16.4 kPa (2.38 psi.). The peak consolidation temperature was maintained for only about a minute before the cooling cycle was initiated.

The resulting composite, exhibiting good interlayer bonding, was set endwise against a small steel plate to form a "T" junction, and was silver soldered to the plate. A second small steel plate was then silver brazed to the opposite end of the microlaminate sample to form a small "I" beam sample. Repeated vigorous flexing and bending did not result in delamination of the composite or separation of the composite from either of the steel endplates.

The significance of the above result is that, in addition to having utility alone as a durable composite material, these composites can also serve as joining structures to form complex assemblies of components otherwise incompatible with each other and with more conventional bonding media. Of course, for these and other special purpose applications, microlaminated composites which are not of homogeneous composition, but instead are of asymmetric composition to achieve gradations in physical and/or chemical properties from one end or surface of the composite to the other, may well be preferred.

The few instances of poor interlayer bonding observed in the various microlaminated composites evaluated were generally attributable to chemical incompatibility between the ceramic foils and substrate layer materials selected. Thus an alumina/yttrium microlaminated sample showed regions of interlayer reaction at the metal/ceramic interfaces, these reactions interfering with metal-ceramic adherence. In the case of a magnesium/alumina composite, magnesium oxidation during consolidation from oxygen in the furnace environment prevented good interlayer bonding from being achieved.

As previously noted, it has been found particularly important in the practice of the invention that the ceramic foils used to provide the sheet stacks for the composites be sufficiently sintered to provide a unitary, flexible and strong ceramic film prior to use. Our attempts to provide ceramic/metal composites from sheet stacks wherein, instead of sintered ceramic foils, green (unfired) ceramic powder tapes were laminated with metal foil layers to provide the sheet stacks, provided products which were not integral and well-bonded composites.

In these trials it appeared that the sintering of the green tapes during the hot pressing of the sheet stacks interfered extensively with bonding to the foil, producing only partially bonded assemblies. We attribute these results to the relatively high degree of shrinkage which occurs in the course of in-plane densification of green ceramic tapes. This shrinkage appeared to cause tape ripping, or in some cases rumpling of the metallic interlayers in the composites, making the achievement of high temperature deformation bonding essentially impossible.

Applications for the microlaminated composites of the invention are numerous, ranging for example from applications such as consumer knives and industrial cutting tools to high temperature air-frame structures, turbine and other heat engine parts including corrosion and wear resistant coverings, and many other products. Thus the foregoing examples and description are intended to be merely illustrative of the many combinations and variations of procedure and composition which may be resorted to by those skilled in the art within the scope of the appended claims.

We claim:

1. A method for making a microlaminated composite article which essentially consists the steps of:
    providing at least one sheet of flexible sintered crystalline ceramic foil;
    providing at least one inorganic substrate layer of a metal, intermetallic compound or crystalline ceramic material;
    stacking the ceramic foil on the substrate layer; and
    heating the stack under pressure at a temperature and for a time at least sufficient to obtain permanent bonding of the ceramic foil sheet directly to the inorganic substrate layer.

2. A method for making a microlaminated composite article which essentially consists the steps of:
    providing a plurality of sheets of flexible sintered crystalline ceramic foil;
    providing one or a plurality of inorganic substrate layers of a metal, intermetallic compound or crystalline ceramic material;
    forming a sheet stack wherein at least some of the sheets of ceramic foil are in contact with one or more of the inorganic substrate layers; and
    heating the sheet stack under pressure to a temperature and for a time at least sufficient to obtain permanent bonding of the ceramic foil sheets directly to the one or more inorganic substrate layers in contact therewith.

3. A method in accordance with claim 2 wherein the substrate layers are sheets of flexible metal, intermetallic or ceramic foil, and wherein the sheet stack is characterized by at least some alternate interleaving of the first sheets and the second sheets or layers.

4. A method in accordance with claim 1 wherein the pressure does not exceed about 500 kPa.

5. A method for making a composite article which essentially consists the steps of:
    providing one or more sheets of a flexible sintered crystalline ceramic foil;
    providing one or more inorganic substrate sheets of metallic or intermetallic composition;
    forming the sheets of foil and substrate sheets into a sheet stack wherein one or more sheets of the ceramic foil are positioned adjacent one or more of the inorganic substrate sheets;
    heating the ceramic foil and substrate sheets to a temperature in the range from about 300° C. below the lowest sintering temperature of the ceramic foil and inorganic substrate sheets to just below lowest melting temperature of the ceramic foil and inorganic substrate sheets; while
    applying pressure to the sheet stack, said pressure being at least sufficient to insure full surface contact between the foil and substrate sheets;
    said heating being continued for a time at least sufficient to obtain direct physical bonding of the ceramic foil to the inorganic substrate sheets.

6. A method in accordance with claim 5 wherein a plurality of sheets of ceramic foil and a plurality of inorganic substrate sheets are provided, wherein the inorganic substrate sheets include sheets of metallic or intermetallic foil, and wherein at least some of the ceramic foil sheets are interleaved with the sheets of metallic or intermetallic foil.

7. A method in accordance with claim 6 wherein the ceramic foil has a composition selected from the group consisting of zirconia, stabilized or partially stabilized zirconia, hafnia, alumina, silica, titania, mullite, spinel, chromium oxide, sialon, nasicon, silicon carbide, titanium carbide, silicon nitride, titanium nitride, zircon, zirconium carbide, titanium diboride, and combinations thereof.

8. A method in accordance with claim 7 wherein the ceramic foil has a composition selected from the group consisting of stabilized zirconia and partially stabilized zirconia, and wherein the zirconia includes at least one stabilizer selected from the group consisting of alkaline earth oxides, rare earth oxides, and combinations thereof.

9. A method in accordance with claim 7 wherein the ceramic foil has a thickness in the range of about 10–100 micrometers.

10. A method in accordance with claim 9 wherein the ceramic foil has a thickness in the range of about 25–50 micrometers.

11. A method in accordance with claim 5 wherein the inorganic substrate sheets are metal foil sheets having a composition selected from the group consisting of ferrous metals, copper, aluminum, nickel, nickel-based alloys, titanium, molybdenum, niobium, tungsten, tantalum, chromium, and chromium-based alloys.

12. A method in accordance with claim 11 wherein the pressure applied to the foil sheets is in the range of 1–50 kPa.

13. A microlaminated composite article comprising:
    a plurality of layers of ceramic foil partly or wholly interleaved by a plurality of metallic or intermetallic substrate layers, wherein:
    the layers of ceramic foil are directly bonded to the substrate layers in contact therewith at ceramic foil-substrate interfaces therebetween;
    the layers of ceramic foil and the substrate layers have thicknesses not exceeding about 250 micrometers, and at least one dimension of length or breadth in excess of 1 cm;
    the ceramic foil layers and metallic substrate layers are essentially free of pin-hole defects the ceramic foil-substrate interfaces are essentially free of added adhesive interlayer material.

14. A composite article in accordance with claim 13 wherein the ceramic foil has a composition selected from the group consisting of zirconia, stabilized or partially stabilized zirconia, hafnia, alumina, silica, titania, mullite, spinel, chromium oxide, sialon, nasicon, silicon carbide, titanium carbide, silicon nitride, titanium nitride, zircon, zirconium carbide, titanium diboride, and combinations thereof.

15. A composite article in accordance with claim 13 wherein the ceramic foil has a composition selected from the group consisting of stabilized zirconia and partially stabilized zirconia, and wherein the zirconia includes at least one stabilizer selected from the group consisting of alkaline earth oxides, rare earth oxides, and combinations thereof.

16. A composite article in accordance with claim 14 wherein the ceramic foil has a thickness in the range of about 10–100 micrometers.

17. A composite article in accordance with claim 16 wherein the ceramic foil has a thickness in the range of about 25–50 micrometers.

18. A composite article in accordance with claim 14 wherein the inorganic substrate sheets are metal foil sheets having a composition selected from the group consisting of ferrous metals, copper, aluminum, nickel, nickel-based alloys, titanium, molybdenum, niobium, tungsten, tantalum, chromium, and chromium-based alloys.

* * * * *

UNITED STATES PATENT AND TRADEMARK OFFICE
CERTIFICATE OF CORRECTION

PATENT NO. : 5,350,637
DATED : September 27, 1994
INVENTOR(S) : Thomas D. Ketcham; Leroy S. Share; Dell J. St. Julien It is certified that error appears in the above-indentified patent and that said Letters Patent is hereby corrected as shown below:

Col. 20, line 18, "hasicon" should be "nasicon"

Signed and Sealed this

Thirty-first Day of October 1995

Attest:

BRUCE LEHMAN

Attesting Officer            Commissioner of Patents and Trademarks